(12) United States Patent
Hirata et al.

(10) Patent No.: US 8,690,345 B2
(45) Date of Patent: Apr. 8, 2014

(54) PROJECTION IMAGE DISPLAY APPARATUS HAVING A FIRST LENS AND A SECOND LENS ADJACENT TO THE SCREEN

(75) Inventors: Koji Hirata, Yokohama (JP); Masahiko Yatsu, Fujisawa (JP); Naoyuki Ogura, Machida (JP); Hidehiro Ikeda, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 117 days.

(21) Appl. No.: 13/251,431

(22) Filed: Oct. 3, 2011

(65) Prior Publication Data

US 2012/0081676 A1 Apr. 5, 2012

(30) Foreign Application Priority Data

Oct. 4, 2010 (JP) ................................. 2010-224473

(51) Int. Cl.
G03B 21/14 (2006.01)
(52) U.S. Cl.
USPC .................. 353/38; 353/30; 353/37; 353/88; 353/99; 353/100; 359/651; 359/666; 748/744; 748/781
(58) Field of Classification Search
USPC ........... 353/30, 31, 32, 34, 37, 38, 88, 97–99, 353/100–102; 359/237, 649, 651, 664, 666, 359/716, 726, 735; 348/744, 781, 782, 787, 348/789; 349/5, 7–9
See application file for complete search history.

(56) References Cited

U.S. PATENT DOCUMENTS

| 7,391,577 B2* | 6/2008 | Inamoto ........................ 359/649 |
| 7,967,448 B2* | 6/2011 | Destain ........................... 353/77 |
| 8,179,607 B2* | 5/2012 | Amano ......................... 359/650 |
| 2004/0032539 A1* | 2/2004 | You ............................... 348/744 |
| 2006/0098125 A1* | 5/2006 | Moskovich et al. ........... 348/779 |
| 2009/0009885 A1* | 1/2009 | Smith et al. ................... 359/708 |
| 2009/0207381 A1* | 8/2009 | Hirata et al. ..................... 353/20 |

FOREIGN PATENT DOCUMENTS

| JP | 09-138333 | 5/1997 |
| JP | 2004-361620 | 12/2004 |
| JP | 2008-250296 | 10/2008 |
| JP | 2009-86315 | 4/2009 |

* cited by examiner

*Primary Examiner* — Sultan Chowdhury
(74) *Attorney, Agent, or Firm* — Antonelli, Terry, Stout & Kraus, LLP.

(57) ABSTRACT

There is provided a projection image display apparatus which is excellent in quality of a display screen image even if a projection lens using a plastic lens having an asymmetrical shape with respect to an optical axis is used. The apparatus includes a projection lens which obliquely projects video light on a screen, an integrator which aligns a polarization direction of light from a light source, and an image display element (P, PL) which modulates light having the aligned polarization direction by an image signal. The projection lens includes multiple plastic lenses, and each of the multiple plastic lenses is arrayed, respectively, by shifting a gate direction to each other by 180 degrees. When the projection lens includes n sheets (n is a natural number) of plastic lenses, each of the multiple plastic lenses may be arrayed, respectively, by shifting a gate direction to each other by (360/n) degrees.

16 Claims, 11 Drawing Sheets

| ITEM # | NAME | REFRACTIVE INDEX | BIREFRIN-GENCE | WATER ABSORPTION | FEATURE |
|---|---|---|---|---|---|
| 1 | ACRYLIC | 1.493 | 10nm | 1.2% | HIGH TRANSMISSIVITY |
| 2 | ZEONEX48R | 1.5311 | 50nm | 0% | FLUIDITY POOR |
| 3 | ZEONEX480 | 1.5251 | 100nm | 0% | FLUIDITY EXCELLENT |
| 4 | ZEONEX330 | 1.5094 | 10nm | 0% | FLUIDITY EXCELLENT |

PROJECTION IMAGE DISPLAY APPARATUS HAVING A FIRST LENS AND A SECOND LENS ADJACENT TO THE SCREEN

INCORPORATION BY REFERENCE

The present application claims priority from Japanese application JP2010-224473 filed on Oct. 4, 2010, the content of which is hereby incorporated by reference into this application.

BACKGROUND

The present invention relates to a projection image display apparatus.

As a large-size projection image display apparatus in which a display screen is magnified, there is known a projection image display apparatus which projects an image reflected on an image display element such as a transmission type liquid crystal panel and a reflection type liquid crystal panel on a screen as a projection surface by using a projection lens.

In recent years, a projection image display apparatus using a projection lens in which a distance from a screen to a projection image display apparatus is short, namely, having a so-called short projection distance becomes widespread. For example, there is disclosed an apparatus which includes a projection lens including a first optical system having a transmissive refractive element and a second optical system having a reflective refractive element, and a part of lenses of the first optical system are contained in a lower space, whose lower limit is defined by a lower edge of the second optical system (see, e.g., JP-A-2009-86315). Further, there is disclosed a projection optical system which can project a projection image of proper quality, on a large screen with a short full length, by combining a lens system with a concave mirror (see, e.g., JP-A-2008-250296).

SUMMARY

According to JP-A-2009-86315 and JP-A-2008-250296, a projection image display apparatus is designed with a plastic lens having a symmetrical shape with respect to an optical axis of a lens. Therefore, polarization turbulence and deterioration in quality of a projection image is not taken into consideration due to residual stress generated in the case of molding a plastic lens and large or small photo-elastic coefficient of inherent plastics materials.

Particularly, as a plastic lens material of JP-A-2008-250296, there is used ZEONEX 48R manufactured by ZEON CORPORATION which relieves deterioration in an image forming performance due to a change in a shape and change in a refractive index due to moisture absorption and which does not adsorb moisture (moisture absorption is 0%) as a material excellent in fluidity for improving the molding accuracy. Since a conventional plastic lens has a symmetrical circular shape with respect to an optical axis of a lens, molding conditions that fluidity is relatively preferable and residual stress is small is easy to be acquired. Therefore, birefringence caused by materials illustrated in FIG. 12 is not taken into consideration.

In view of the foregoing, it is an object of the present invention to provide a projection image display apparatus which projects a display screen image with excellent quality even if using a projection lens having a plastic lens with an asymmetrical shape with respect to an optical axis.

To solve the above-described problem, one of preferred embodiments of the invention is as follows.

The projection image display apparatus includes a projection lens which obliquely projects video light on a screen, an integrator which aligns a polarization direction of light from a light source, and an image display element which modulates light having the aligned polarization direction by an image signal. The projection lens includes multiple plastic lenses, and each of the multiple plastic lenses is arrayed by shifting a gate direction to each other by 180 degrees.

Other objects, features and advantages of the invention will become apparent from the following description of the embodiments of the invention taken in conjunction with the accompanying drawings.

DESCRIPTION OF THE EMBODIMENT

Preferred embodiments of the present invention will now be described in detail below with reference to the accompanying drawings.

Figure 1:
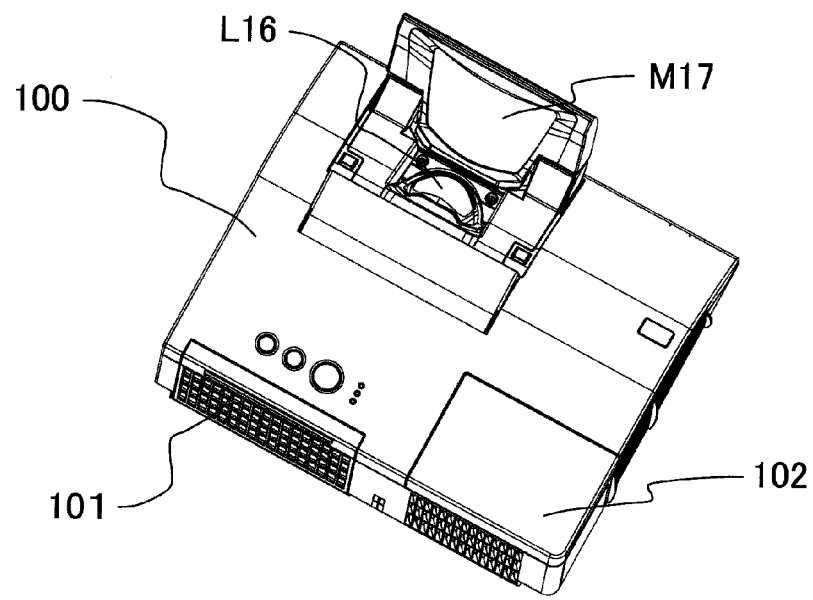
FIG. 1 is the entire perspective view illustrating an appearance of a projection image display apparatus.

FIG. 1 is the entire perspective view illustrating an appearance of a projection image display apparatus. A reference numeral 100 denotes the projection image display apparatus, a reference numeral 101 denotes a filter cover which protects a dust-proof filter which is provided on a front face of a set and removes dust from cooling air taken in an inside of the set, and a reference numeral 102 denotes a protective cover which protects a lamp replacement portion attached to a top surface of the set, respectively. On a top edge of the above units, a plastic lens with a free-form surface illustrated in a reference numeral L16 and a free-form surface mirror illustrated in a reference numeral M17 are provided as a part of a projection lens which forms an oblique projection optical system.

Figure 2:
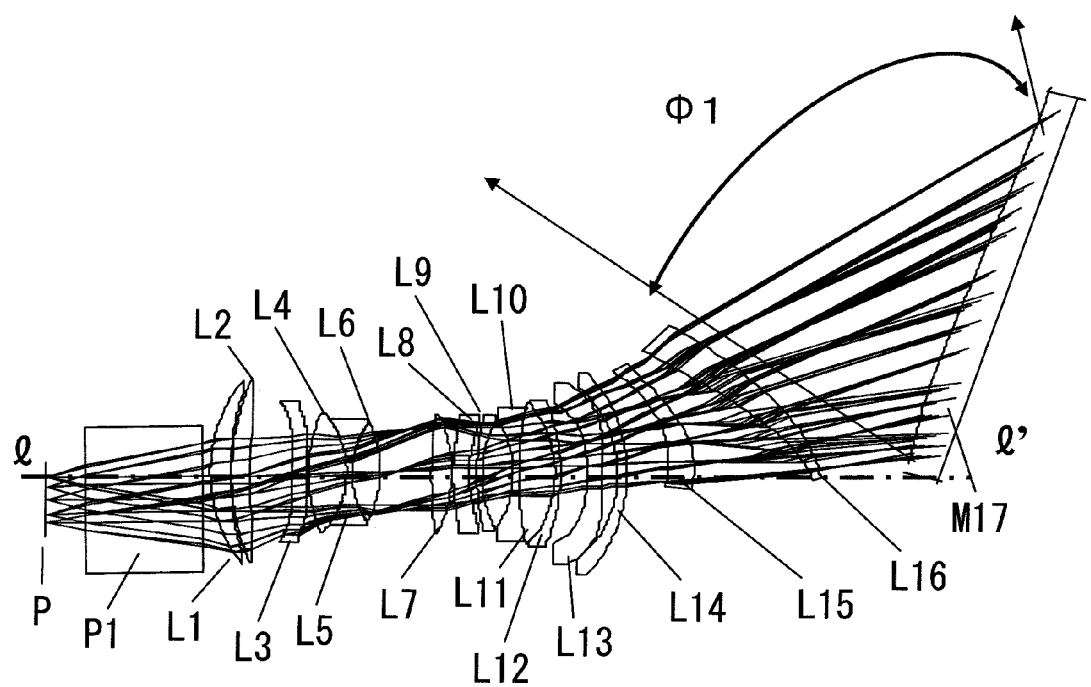
FIG. 2 is a lens layout drawing illustrating a principle of a projection lens in an oblique projection optical system.

FIG. 2 is a lens layout drawing illustrating a principle of the projection lens in the oblique projection optical system. The projection lens is configured by 16 sheets of lenses illustrated in reference numerals L1 to L16 and a sheet of mirror illustrated in a reference numeral M17. A mirror reflective surface of the mirror M17 and lenses illustrated in reference numerals L15 and L16 form a free-form surface shape, respectively. Therefore, even in the oblique projection optical system, a degree of freedom in design is approximately five times as large as that of an aspheric surface lens and excellent aberration correction is possible.

Further, image light flux (the entirety is illustrated by φ1) from an image display element illustrated in a reference numeral P passes through a different portion of each lens in the projection lens with respect to an image focus location of a projection plane. The free-form surface mirror M17 and free-form surface lenses L15 and L16 are positioned at the upper part of an optical axis shared by other almost lenses, have no unnecessary lens effective region, and can be miniaturized and therefore, cost can be reduced. Further, when lenses illustrated in reference numerals L3 and L8 are constituted to have aspheric shapes, correction of coma aberration and spherical aberration is performed. Further, since a lens illustrated in a reference numeral L13 is arrayed in a position through which light flux unevenly passes, when the lens is constituted to have an aspheric shape, correction of the coma aberration is performed.

Figure 3:
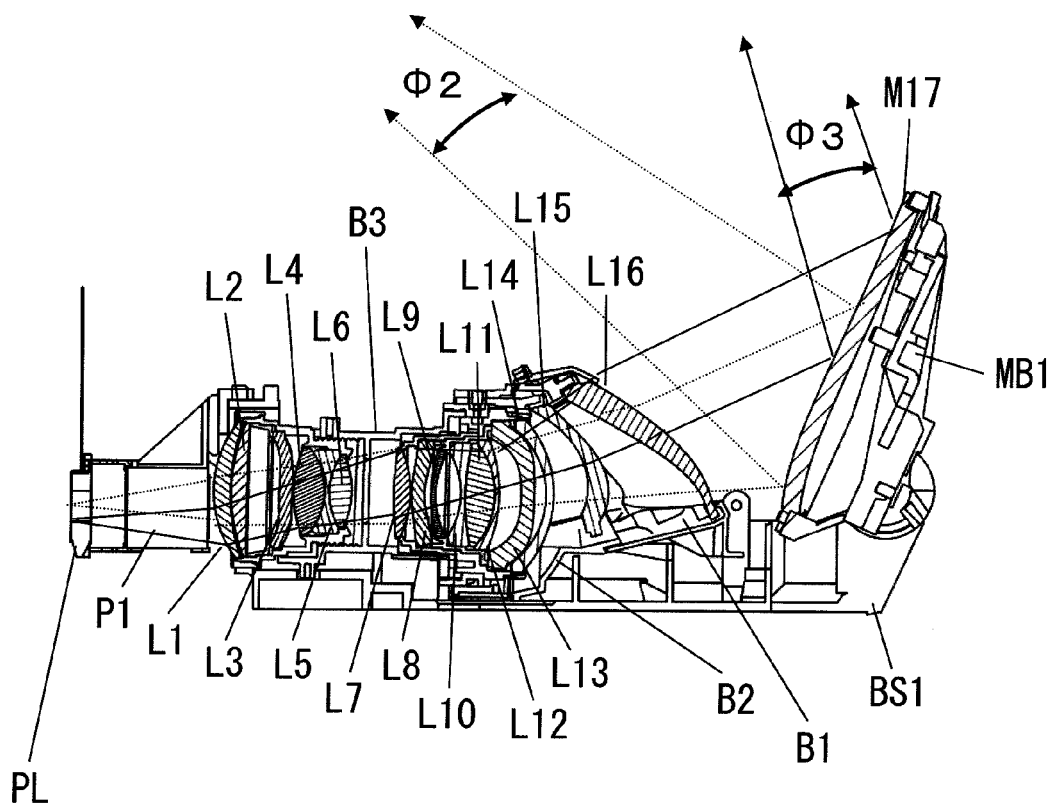
FIG. 3 is a cross-sectional view illustrating an array of structural bodies of a projection lens in an oblique projection optical system.
Figure 4A:
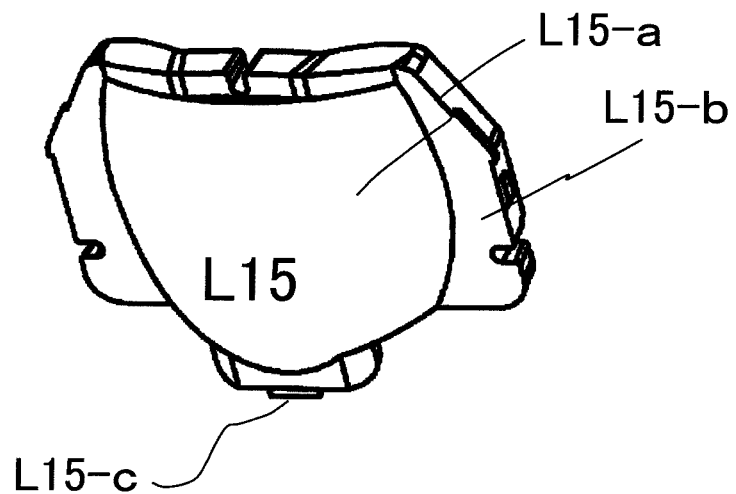
FIGS. 4A to 4D illustrate a free-form surface lens L15.
Figure 4B:
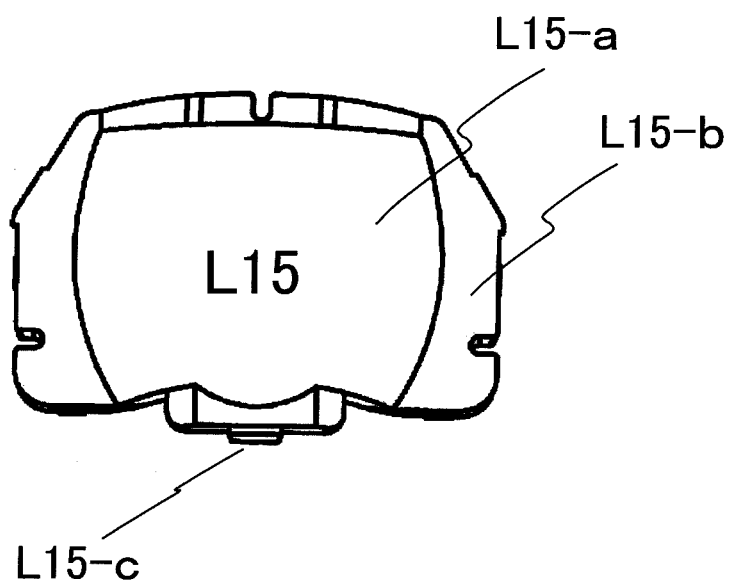
Figure 4C:
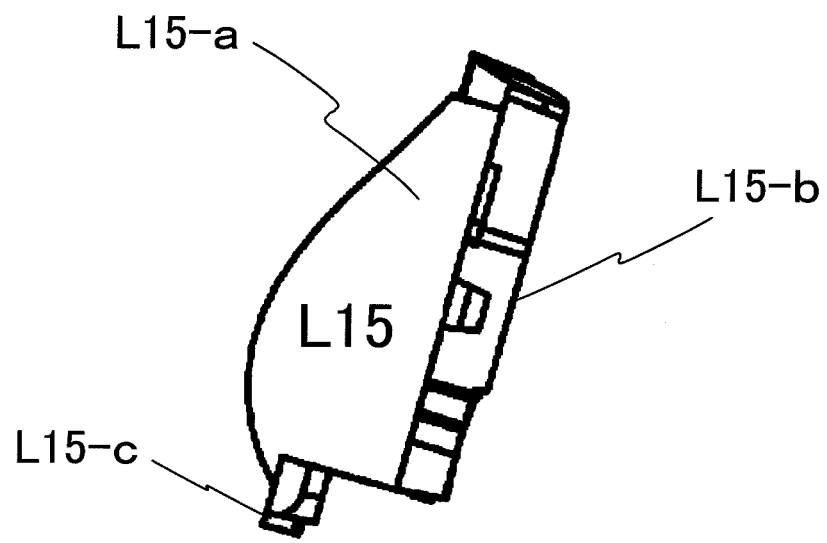
Figure 4D:
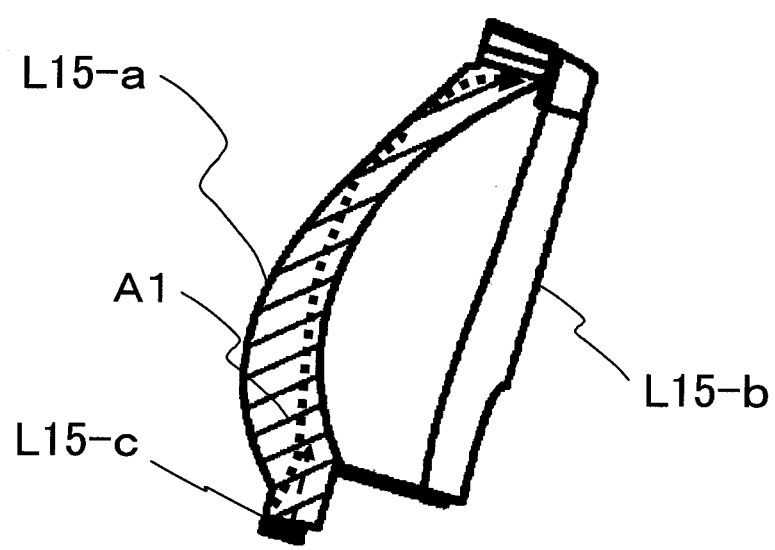

FIG. 3 is a cross-sectional view illustrating an array of structural bodies of the projection lens in the oblique projection optical system. A reference numeral PL denotes an image display element, and a reference numeral P1 denotes a cross prism. For convenience of explanation, FIG. 3 illustrates that light flux φ3 which produces an image at the upper end of the projection plane and light flux φ2 which produces an image approximately at the central portion of the projection plane pass through which portion of separate lenses (illustrated by L1 to L16 in the figure) constituting the projection lens. Upper limit rays of the light flux φ3 which produces an image at the upper end of the projection plane and lower limit rays of the light flux φ2 which produces an image approximately at the central portion of the projection plane are not superimposed on a aspheric lens L13 and the free-form surface lenses L15 and L16. Therefore, an aberration correction can be performed separately and a correction ability is largely improved.

In the free-form surface mirror M17, the above tendency further becomes prominent. The lenses (L1 to L14) which make contribution to an aberration correction in a region relatively near to the optical axis are assembled into a barrel B3. On the other hand, the lenses (L15, L16) which make contribution to an aberration correction in a region separate from the optical axis are assembled into another barrel B2 for focus adjustment. Spacing between the L13 and L14 and that between the L16 and M17 can be adjusted as well as spacing between the L15 and L16 can be adjusted.

On the other hand, the free-form surface mirror M17 is attached to a mirror base MB1, and can be opened and closed by an electric motor (not illustrated). All of the lenses are fixed on a projection lens base with a high degree of accuracy, so that a predetermined focus performance may be acquired.

FIG. 4 illustrates the free-form surface lens L15. FIG. 4A is a perspective view of the L15, FIG. 4B is a front view of the L15, FIG. 4C is a side view of the L15, and FIG. 4D is a side view partially including a cross-sectional surface of the L15. In FIG. 4, since the L15 is a plastic lens, positioning at the time of being assembled into the barrel B1 and a lens edge part L15-b for retention are provided on the outside of the lens effective region L15-a.

FIG. 5 illustrates the free-form surface lens L16. FIG. 5A is a perspective view of the L16, FIG. 5B is a front view of the L16, FIG. 5C is a side view of the L16, and FIG. 5D is a side view partially including a cross-sectional surface of the L16. In the same manner as in FIG. 4, since the L16 is a plastic lens, positioning at the time of being assembled into the barrel B1 and a lens edge part L16-b for retention are provided on the outside of the lens effective region L16-a.

In the free-form surface lenses L15 and L16 and free-form surface mirror M17, a mold is manufactured. While considering shrinkage or warpage of plastics, a shape correction of the mold is repeated several times so that an error of a molded lens surface shape may be minimized with respect to a design shape. The mold with a shape obtained through the correction is used and a lens is molded by injection molding.

In an injection molding machine, pelletized or powdery resin is thermally dissolved in the mold. While rotating a screw and applying pressure, resin is extruded into a space formed by movable and fixed rollers from a gate through a spool and runner of the mold, and is filled in the mold.

Figure 6:
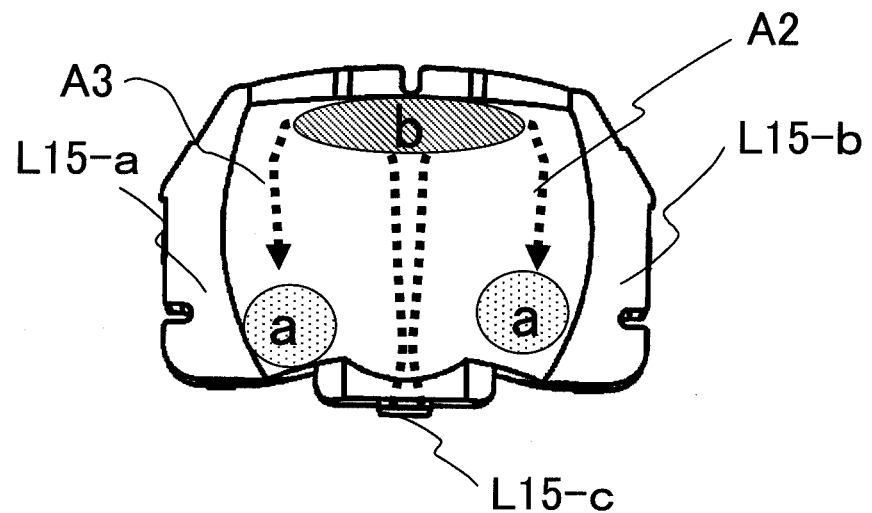
FIG. 6 illustrates a relationship between fluidity and distortion of plastics of a free-form surface lens L15.

In the L15 having an asymmetrical shape with respect to the optical axis, in an axis (an axis in the flow direction and illustrated in A2 and A3) formed by the gate L15-c and a plane facing to the gate L15-c and an axis perpendicular to the above axis as illustrated in FIG. 6, since a shrinkage rate due to cooling is different from a delay of a cool time of the resin in the mold, a shape accuracy becomes uneven.

Further, a thickness of the lens is easy to be thick near the gate L15-c, and conversely, a thickness of the lens is easy to be thin near the counter-gate (region illustrated in "b" of the figure). Therefore, a molding manufacturer has a technical know-how that molding conditions are controlled so as to acquire an optimum shape.

Further, in the lens region ("a" in the figure) of each side of the gate and counter-gate ("b" in the figure) in the lens effective region, since the lens shape is nonaxisymmetrical with respect to the optical axis of the lens, large residual stress remains during the molding due to delay of the cool time of resin and difference in the flow direction of resin. The flow direction of resin on the lens surface at this time is illustrated in A1 of FIG. 4D.

Figure 5A:
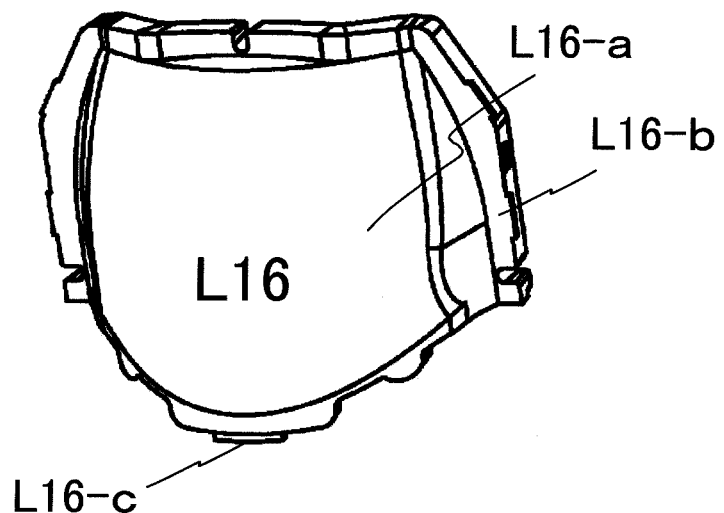
FIGS. 5A to 5D illustrate a free-form surface lens L16.
Figure 5B:
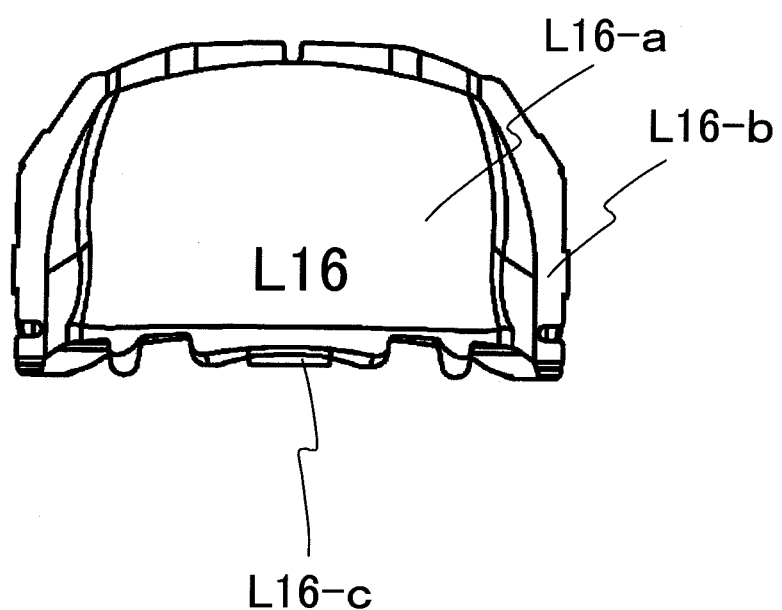
Figure 5C:
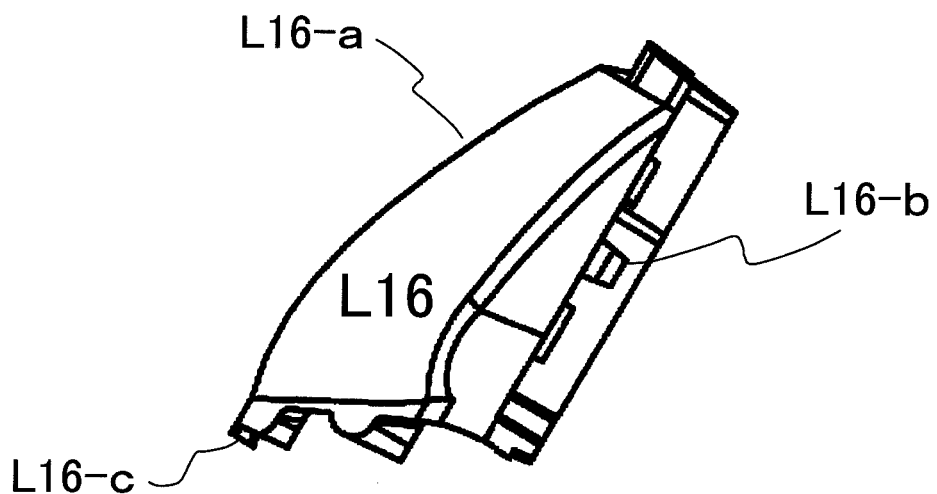
Figure 5D:
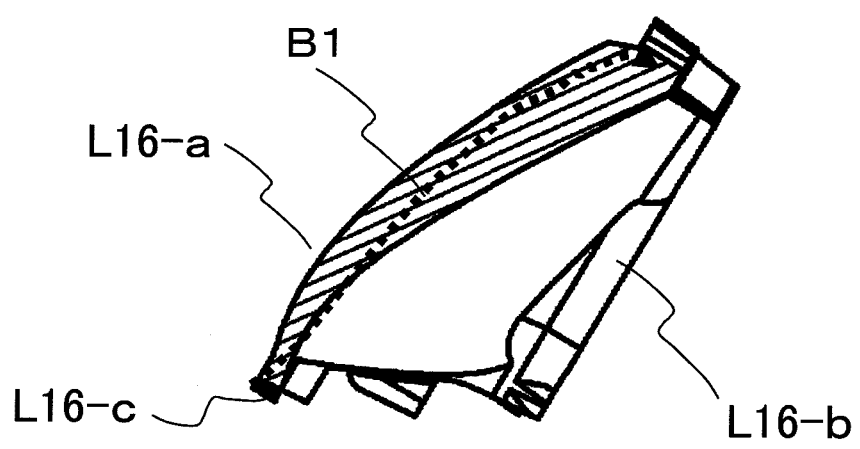
Figure 5D:
Figure 7:
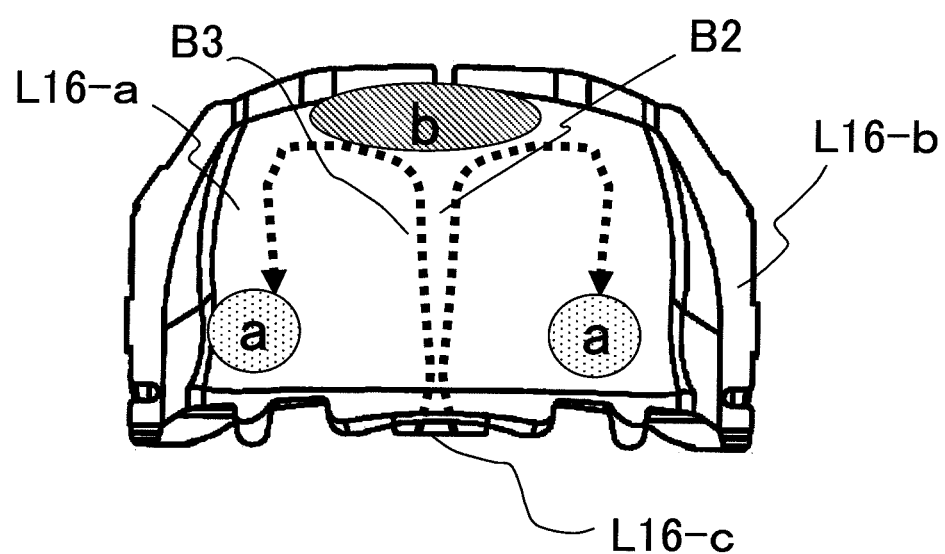
FIG. 7 illustrates a relationship between fluidity and distortion of plastics of a free-form surface lens L16.

Also, the L16 having an asymmetrical shape with respect to the optical axis is illustrated in the same manner as in the L15 (the axis in the flow direction is illustrated in B2 and B3 of FIG. 7, and the flow direction of resin on the lens surface is illustrated in FIG. 5D).

Figure 8:
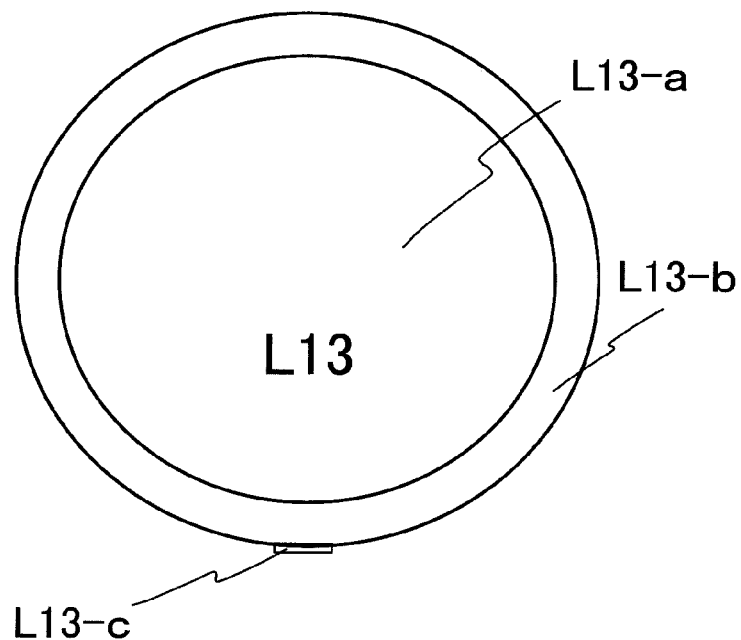
FIG. 8 illustrates a circular symmetrical plastic lens L13 with respect to an optical axis.
Figure 9:
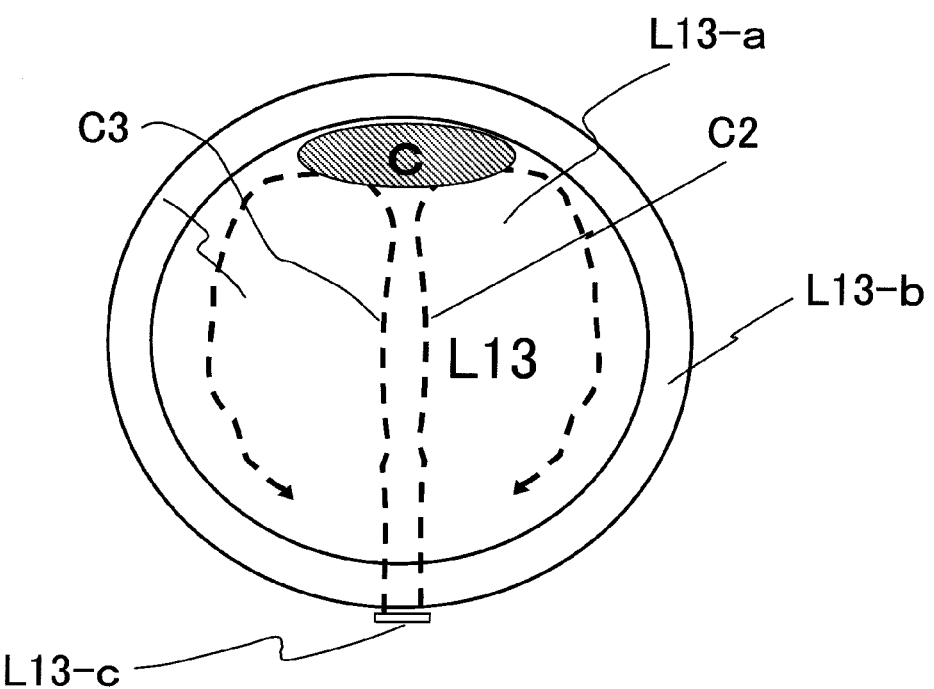
FIG. 9 illustrates a relationship between fluidity and distortion of plastics of a lens L13.

FIG. 8 illustrates a circular symmetrical plastic lens L13 with respect to the optical axis. In the same manner as in the L15 and L16, positioning at the time of being assembled into the barrel B3 and a lens edge part L13-b for retention are provided on the outside of the lens effective region L13-a. In the L13 having a symmetrical lens shape with respect to the optical axis, in an axis (an axis in the flow direction and illustrated in C2 and C3) formed by the gate L13-c and a plane facing to the gate L13-c and an axis perpendicular to the above axis as illustrated in FIG. 9, since a shrinkage rate due to cooling is different from a delay of a cool time of the resin in the mold, a shape accuracy becomes uneven.

Figure 10:
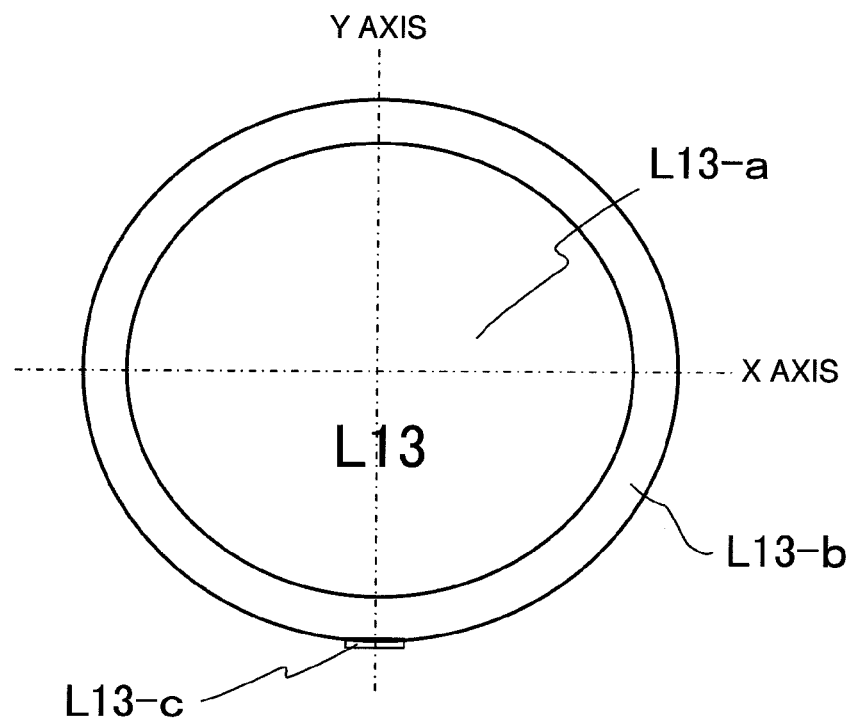
FIG. 10 illustrates a shape evaluation of a plastic lens.
Figure 11:
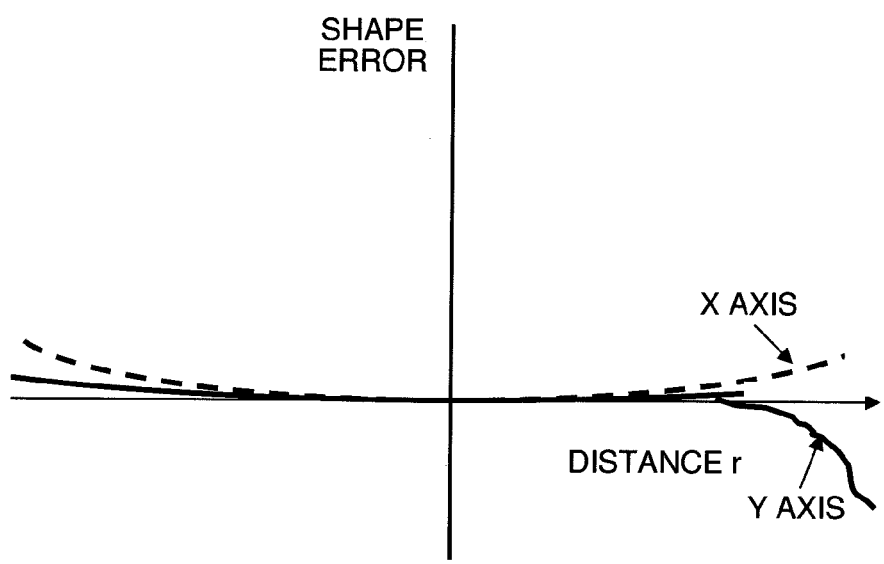
FIG. 11 illustrates a shape evaluation of a plastic lens.

FIGS. 10 and 11 are schematic diagrams describing a shape evaluation of the plastic lens constituting the projection lens. In FIGS. 10 and 11, an axis formed by the gate and a plane facing to the gate is assumed to be defined as the Y axis, and an axis perpendicular to the above axis is assumed to be defined as the X axis as illustrated in FIG. 9. Further, a thickness of the lens is easy to be thick near the gate L13-c (−Y), and conversely, a thickness of the lens is easy to be thin near the counter-gate (region of "c" in FIG. 9 and +Y in FIG. 10). In the X axis, since plastic resin is finally filled during the injection molding, the shrinkage is late and a thickness of the lens is easy to be even in the horizontal direction (−X and +X in FIG. 10). As a result, a thickness of the lens is easy to be thin in the +Y axis direction. To cope with the above problem, a molding manufacturer has a technical know-how that molding conditions are controlled so as to acquire an optimum shape. On the other hand, since the lens shape is axisymmetrical with respect to the optical axis of the lens, the flow direction of resin is excellent in the lens region of each side of the gate and counter-gate ("c" region in FIG. 9) in the lens effective region. Therefore, the residual stress is hard to remain during the molding.

As described above, the shape accuracy of the symmetrical plastic lens with respect to the optical axis is evaluated when an axis formed by the gate and a plane facing to the gate is defined as the Y axis, and an axis perpendicular to the above axis is defined as the X axis as illustrated in FIG. 10. Further, the shape accuracy is acquired when a sag quantity to a distance from the optical axis is compared with a design shape. However, an error in the Y axis and that in the x axis are not equal to each other for the above-described reason, and therefore, a symmetry property is impaired. Therefore, there is conventionally used a method in which reduction in an image forming performance is relieved when an axis (region) having a worst symmetry property is combined with a region through which a video beam fails to pass and they are assembled into the barrel. The above reduction technology is not studied since small residual stress occurs during the molding in a conventional symmetrical aspheric plastic lens with respect to the optical axis and an influence to image quality is small.

Figures 12, 13:
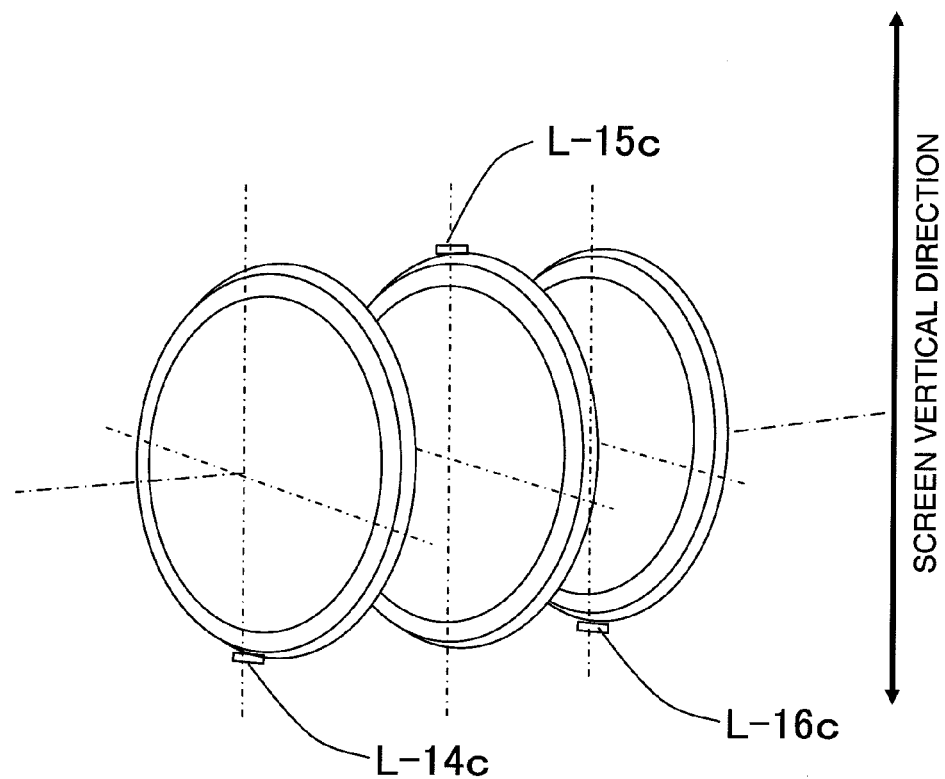
FIG. 12 illustrates a table obtained by collecting solid state properties of plastic lens materials.
FIG. 13 illustrates an appearance in which a gate direction of each plastic lens is shifted.

At an initial stage of the development, as the projection lens for realizing the oblique projection optical system according to the present embodiment, the inventors study plastic lens materials to be used by using as a base the projection lens illustrated in FIGS. 2 and 3. FIG. 12 illustrates a table obtained by collecting solid state properties of the plastic lens materials studied at this time. Acrylic is a most general material among plastics materials, and has high transmissivity and a small birefringence quantity (birefringence quantity generated at a distance of 10 mm under the same molding conditions in the figure).

On the other hand, the water absorption (saturation water absorption) is large at 1.2% by weight, and after the projection lens manufactured by way of trial is left at 40° C., 95% RH atmosphere for 2000 hours, a focus performance is evaluated. As a result, there is revealed that the focus performance varies depending on a change in a shape and change in a refractive index due to moisture absorption of the plastic lens, and the projection lens cannot be adopted for a projection lens necessary for high resolution.

Next, there is studied the use of ZEONEX 480 manufactured by ZEON CORPORATION in which a change in a shape and change in a refractive index due to moisture absorption are small with respect to acrylic materials and reduction in an image forming performance can be relieved and which does not adsorb moisture (moisture absorption is 0%) as a material excellent in fluidity for improving the molding accuracy. Since a light beam obliquely passes through a plastic lens, an aspheric lens which is axisymmetrical with respect to the optical axis and has a small rapid change in a local thickness is appropriate for a plastic lens adopted in the projection lens adapted to the oblique projection optical system in which a light beam obliquely passes through a plastic lens. Further, in an aspheric lens which is axisymmetrical with respect to the optical axis, residual stress is small. Even in the projection image display apparatus using polarization by using a transmission type liquid crystal panel and a reflection type liquid crystal panel as an image display element, deterioration in quality of a display screen is small due to polarization turbulence.

On the other hand, the L15 and L16 each having a free-form surface shape in which a rapid change in a local thickness is present are molded by using ZEONEX 480 for a light beam which is nonaxisymmetrical with respect to the above-described optical axis and is obliquely made incident. When the transmission type liquid crystal panel and the reflection type liquid crystal panel are used as an image display element into the projection image display apparatus using polarization, quality (coloring of screen) of a display screen is significantly deteriorated due to polarization turbulence. As a result of the demonstration study, the inventors find out that the ZEONEX 480 cannot be used.

To cope with the above problem, the inventors change to a design in which the L15 and L16 each having a free-form surface shape are molded by using ZEONEX 330 and ZEONEX 48R. The transmission type liquid crystal panel and the reflection type liquid crystal panel are used as an image display element into the projection image display apparatus using polarization while using the actually-molded lens. As a result, there is revealed that deterioration in quality of the display screen can be reduced to a problem-free level by using ZEONEX 330. On the other hand, it is relatively difficult to find out molding conditions for satisfying request specifications in both of a shape accuracy of a lens plane and an appearance (microcrack) in the ZEONEX 330. Based on the above fact, the same study is newly performed also in the ZEONEX 48R.

Since the fluidity is poor in the ZEONEX 48R, the resin temperature and mold temperature during the molding are required to be higher than those of the ZEONEX 330. As a result of the study, there is revealed that it is relatively easy to find out molding conditions for satisfying request specifications in both of a shape accuracy of a lens plane and an appearance (microcrack). Consequently, the inventors change to the design using the ZEONEX 48R. The transmission type liquid crystal panel and the reflection type liquid crystal panel are used as an image display element into the projection image display apparatus using polarization while using the actually-molded lens. Further, the inventors study deterioration in quality (coloring of screen) of a projection image. The inventors reveal that the study result is a poor level as compared with the result at the time of using the ZEONEX 330.

To cope with the above problem, the inventors perform the demonstration study about a method for relieving deterioration in quality (coloring of screen) of a projection image based on a new master method for combining residual stress generated during the molding with multiple sheets of plastic lenses and relieving the residual stress. As a result, the inventors reveal that in the multiple sheets of plastic lenses constituting the projection lens, when lenses are assembled in positions shifted by about (360/the number of sheets of the plastic lenses) degrees in the gate direction to each other of each plastic lens, part of the residual stress is cancelled and quality of the projection image is improved.

Further, the gate direction of the plastic lens (L16) arrayed in a position nearest to a video display surface among the above plastic lenses is approximately aligned to the vertical direction of the magnification projection screen to thereby assemble the plastic lenses. The above process permits the projection image display apparatus to further acquire a projection image of excellent quality because a few video beams pass through a region in which residual stress remains. Needless to say, in the same manner, the same effect is acquired even if the gate direction of the plastic lens (L16) arrayed in a position nearest to a video display surface is approximately aligned to the screen short side direction of the magnification projection screen to thereby assemble the plastic lens.

Further, when the number of sheets of the plastic lens is an odd number, they are assembled in positions shifted by about 180 degrees in the gate direction to each other of each plastic lens. At the same time, even if the gate direction of the plastic lens (L16) arrayed in a position nearest to a video display surface among the above plastic lenses is approximately aligned to the vertical direction of the magnification projection screen to thereby assemble the plastic lenses, the same effect is acquired. Or, even if the gate direction of the plastic lens (L16) arrayed in a position nearest to a video display surface among the above plastic lenses is approximately aligned to the screen short side direction of the magnification projection screen to thereby assemble the plastic lenses, the same effect is acquired.

FIG. 13 illustrates an appearance in which the gate (L-c) direction of each plastic lens is shifted. For ease of explanation, here, three sheets of the plastic lenses are continuously illustrated from the plastic lens (L16) arrayed in a position nearest to the video display surface. In FIG. 13, the gate of the L16 is positioned on a line parallel to the vertical direction of the magnification projection screen (screen). The gate of the L15 is positioned in the direction (direction shifted by about 180 degrees) vertically opposite to the gate of the L16. The gate of the L14 is positioned in the same direction as that of the L16.

In FIG. 13, there is illustrated a state in which the gate direction of each plastic lens is shifted by 180 degrees. Needless to say, various modes such as a mode shifted by about (360/the number of sheets of the plastic lens) degrees in the gate direction to each other of each plastic lens are used according to conditions.

As a result of the demonstration study, there is revealed that even if the ZEONEX 48R is used as described above, deterioration in quality (coloring of screen) of the projection screen caused by the residual stress present in each plastic lens can be relieved according to a method for assembling the plastic lens.

Figure 14:
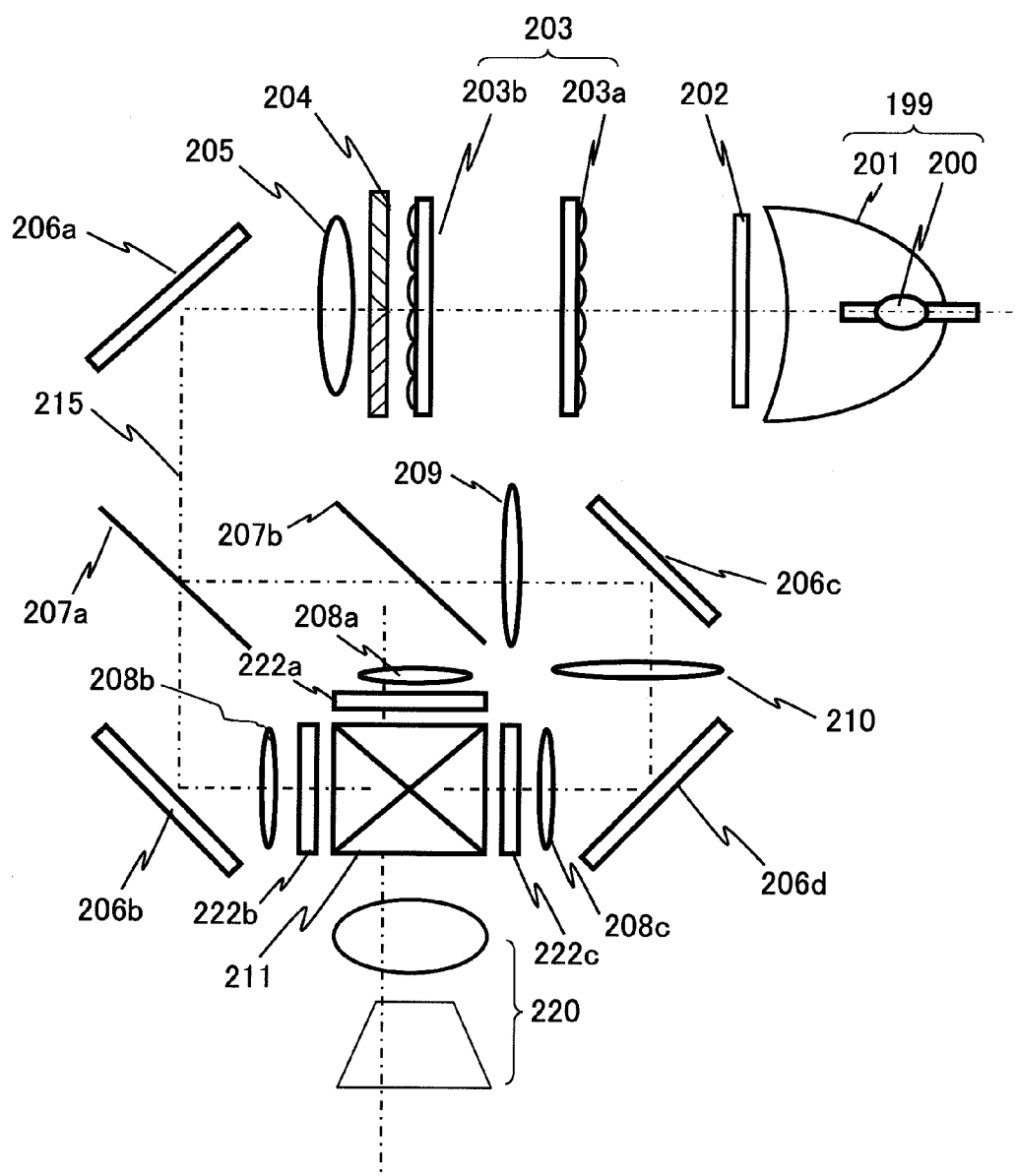
FIG. 14 is a block diagram illustrating one example of the entire configuration of a projection image display apparatus.

Continuously, a video projection unit necessary for constituting the projection image display apparatus will be described with reference to FIG. 14. In FIG. 14, a light source 199 includes a lamp bulb 200 and a reflector 201. This lamp 200 is a white lamp of a high-pressure mercury vapor lamp. The reflector 201 is disposed so as to cover the lamp 200 from the rear side, for example, has a reflection surface of a shape of a paraboloid of revolution, and further has a circular or polygon emission opening. Light emitted from this lamp bulb 200 is reflected by the reflector 201 having a reflection surface with a shape of a paraboloid of revolution, and becomes light flux approximately parallel to an optical axis 215 for emission. Light emitted from the light source 199 reaches an integrator of a multiple lens system.

As described above, the integrator 203 of a multiple lens system is configured by a first multiple lens element 203a and a second multiple lens element 203b. A shape of a lens cell of the first multiple lens element 203a has a rectangular shape approximately analogous to liquid crystal panels 222a, 222b, and 222c viewed from the direction of the optical axis 215, and the first multiple lens element 203a has a configuration in which multiple lens cells are arrayed in a matrix shape and formed. The first multiple lens element 203a divides light incident from the light source into multiple light beams by using multiple lens cells, and leads light to efficiently pass through the second multiple lens element 203b and a polarization conversion element 204. That is, the first multiple lens element 203a is designed so that the lamp bulb 200 and each lens cell of the second multiple lens element 203b may be in an optically conjugate relation.

In the same manner as in the first multiple lens element 203a, a shape of a lens cell of the second multiple lens element 203b is a rectangular shape viewed from the direction of the optical axis 215, and the second multiple lens element 203b has a configuration in which multiple lens cells are arrayed in a matrix shape. The lens cell constituting the lens element projects (maps) a lens cell shape of the first corresponding multiple lens element 203a onto the liquid crystal panels 222a, 222b, and 222c along with a field lens 205 and superimposing lens 208a, 208b, and 208c, respectively.

In the above process, light from the second multiple lens element 203b is aligned to a predetermined polarization direction by a function of the polarization conversion element 204. At the same time, a projection image corresponding to each lens cell of the first multiple lens element 203a is superimposed by functions of the superimposing lenses 208a, 208b, and 208c, respectively, so that the light quantity distribution on the corresponding liquid crystal panels 222a, 222b, and 222c becomes uniform.

Through the above process, the present embodiment is summarized as follows.

The projection image display apparatus includes a projection lens which obliquely projects video light on a screen, an integrator which aligns a polarization direction of light from a light source, and an image display element which modulates light having the aligned polarization direction by using an image signal. The projection lens includes multiple plastic lenses, and each of the multiple plastic lenses is arrayed, respectively, in a position shifted by 180 degrees in the gate direction to each other of each plastic lens.

When the number of sheets of the plastic lens is an even number, each of the multiple plastic lenses may be arrayed so that the gate direction may be aligned to the vertical direction of the magnification projection screen. Further, each of the multiple plastic lenses may be arrayed so that the gate direction may be aligned to the screen short side direction of the magnification projection screen.

When the number of sheets of the plastic lens is an odd number, the gate direction of the plastic lens arrayed in a position nearest to a screen among multiple plastic lenses may be arrayed so as to be aligned with the vertical direction of the magnification projection screen. Further, the gate direction of the plastic lens arrayed in a position nearest to a screen among multiple plastic lenses may be arrayed so as to be aligned with the screen short side direction of the magnification projection screen.

Further, when the projection lens includes n sheets (n is a natural number) of plastic lenses, each of the multiple plastic lenses is arrayed respectively in a position shifted by (360/n) degrees in the gate direction to each other.

At this time, the gate direction of the plastic lens arrayed in a position nearest to a screen among multiple plastic lenses may be arrayed so as to be aligned with the vertical direction of the magnification projection screen.

Further, the gate direction of the plastic lens arrayed in a position nearest to a screen among multiple plastic lenses may be arrayed so as to be aligned with the screen short side direction of the magnification projection screen.

Further, a projection image magnified and projected on a screen may be displayed on the upper part of an optical axis shared by a predetermined number of lenses constituting a projection lens and an axis in which a lower end of a screen display elongates the optical axis and connects the elongated optical axis to the screen. A plastic lens may be molded by a mold having a desired lens surface and injection molding in which plastics is injected from a gate.

According to the present embodiment, there can be provided a projection image display apparatus in which when each plastic lens is assembled into a barrel so that birefringence generated each other may be cancelled even if a plastic lens has a symmetrical or asymmetrical shape with respect to an optical axis and residual stress is large, quality of a display screen image is excellent even if a projection lens using multiple sheets of plastic lenses is used.

According to the present invention, there can be provided a projection image display apparatus in which quality of a display screen image is excellent even if a projection lens using a plastic lens having an asymmetrical shape with respect to an optical axis is used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection image display apparatus comprising:
   an image display element configured to produce an image for projecting on a screen; and
   an optical system configured to magnify and project the image on the screen,
   wherein:
   the optical system includes a first lens and a second lens adjacent to the screen, wherein the second lens is located between the first lens and the screen; and
   a gate position of the first lens of shifted by a fixed angle relative to a gate position of the second lens to reduce adverse effects on the projected image caused by residual stress generated in the formation of the first and second lenses.

2. The projection image display apparatus according to claim 1, further comprising an integrator configured to align a polarization direction of light from a light source,
   wherein in the image display element, light having the aligned polarization direction is modulated by an image signal.

3. The projection image display apparatus according to claim 1,
   wherein the first and second lenses are comprised of plastics.

4. The projection image display apparatus according to claim 1,
   wherein the fixed angle is 180 degrees.

5. The projection image display apparatus according to claim 1,
   wherein, when the optical system includes two or more even-numbered sheets of lenses, a gate direction of each of the multiple lenses is located so as to be aligned with a vertical direction of the screen.

6. The projection image display apparatus according to claims 1,
   wherein, when the optical system includes two or more even-numbered sheets of lenses, a gate direction of each of the multiple lenses is located so as to be aligned with a screen short side direction of the screen.

7. The projection image display apparatus according to claim 1,
   wherein, when the optical system includes three or more odd-numbered sheets of lenses, a gate direction of the first lens is located so as to be aligned with a vertical direction of the screen.

8. The projection image display apparatus according to claim 1,
   wherein, when the optical system includes three or more odd-numbered sheets of lenses, a gate direction of the first lens is located so as to be aligned with a screen short side direction of the screen.

9. A projection image display apparatus comprising:
   an image display element configured to produce an image to be projected on a screen; and
   an optical system configured to magnify and project the image on the screen,
   wherein:
   the optical system includes n (n is a natural number) sheets of lenses; and
   each of the multiple lenses is positioned relative to the others of the multiple lenses so that gate directions of adjacent ones of said lenses are shifted from a gate direction to each other by(360/n) degrees to reduce adverse effects on the projected image caused by residual stress generated in the formation of the sheets of lenses.

10. The projection image display apparatus according to claim 9, further comprising an integrator configured to align a polarization direction of light from a light source,
    wherein in the image display element, light having the aligned polarization direction is modulated by an image signal.

11. The projection image display apparatus according to claim 9,
    wherein the first and second lenses are comprised of plastics.

12. The projection image display apparatus according to claim 9,
    wherein, when the optical system includes two or more even-numbered sheets of lenses, a gate direction of each of the multiple lenses is located so as to be aligned with a vertical direction of the screen.

13. The projection image display apparatus according to claim 9,
    wherein, when the optical system includes two or more even-numbered sheets of lenses, a gate direction of each of the multiple lenses is located so as to be aligned with a screen short side direction of the screen.

14. The projection image display apparatus according to claim 9,
    wherein, when the optical system includes three or more odd-numbered sheets of lenses, a gate direction of the first lens is located so as to be aligned with a vertical direction of the screen.

15. The projection image display apparatus according to claim 9,
    wherein, when the optical system includes three or more odd-numbered sheets of lenses, a gate direction of the first lens is located so as to be aligned with a screen short side direction of the screen.

16. The projection image display apparatus according to claim 3,
    wherein a projection image magnified and projected on the screen is displayed on an upper part of an optical axis shared by a predetermined number of lenses constituting the optical system and an axis in which a lower end of the screen display elongates the optical axis and connects the elongated optical axis to the screen; and
    the lens is molded by a mold having a predetermined lens surface and injection molding for injecting plastics from a gate.

* * * * *